United States Patent
Goebelbecker

(10) Patent No.: US 7,296,403 B2
(45) Date of Patent: Nov. 20, 2007

(54) DUAL WALLED PARTICULAR FILTER FOR TRANSPORTING FILTERED EXHAUST TO A COMPRESSOR OF A DIESEL ENGINE TURBOCHARGER

(75) Inventor: Michael S. Goebelbecker, Dearborn Heights, MI (US)

(73) Assignee: Ford Global Technologies, LLC, Dearborne, MI (US)

( * ) Notice: Subject to any disclaimer, the term of this patent is extended or adjusted under 35 U.S.C. 154(b) by 0 days.

(21) Appl. No.: 11/266,633

(22) Filed: Nov. 3, 2005

(65) Prior Publication Data

US 2007/0095054 A1    May 3, 2007

(51) Int. Cl.
*F01N 3/00*    (2006.01)
(52) U.S. Cl. .................. 60/297; 60/278; 60/280; 60/288; 60/296; 60/311
(58) Field of Classification Search ................ 60/278, 60/280, 286, 288, 292, 295, 296, 297, 299, 60/300, 311
See application file for complete search history.

(56) References Cited

U.S. PATENT DOCUMENTS

| | | | | |
|---|---|---|---|---|
| 4,419,113 A | * | 12/1983 | Smith | ........................ 55/484 |
| 4,673,423 A | * | 6/1987 | Yumlu | ........................ 55/319 |
| 5,806,308 A | * | 9/1998 | Khair et al. | .................. 60/278 |
| 6,276,130 B1 | | 8/2001 | Ito et al. | |
| 6,301,888 B1 | * | 10/2001 | Gray, Jr. | .................... 60/605.2 |
| 6,312,650 B1 | * | 11/2001 | Frederiksen et al. | ........ 422/180 |
| 6,338,245 B1 | | 1/2002 | Shimoda et al. | |
| 6,427,436 B1 | | 8/2002 | Allansson et al. | |
| 6,598,388 B2 | * | 7/2003 | Lucas et al. | .................. 60/311 |
| 6,625,978 B1 | * | 9/2003 | Eriksson et al. | .............. 60/311 |
| 6,883,311 B2 | * | 4/2005 | Liu | ............................ 60/295 |
| 6,899,090 B2 | | 5/2005 | Arnold | |

FOREIGN PATENT DOCUMENTS

EP          1186767          3/2002

* cited by examiner

*Primary Examiner*—Binh Q. Tran

(57) ABSTRACT

An internal combustion engine exhaust gas recirculation system. A turbine section of a turbocharger is coupled to an exhaust manifold of the engine. A compressor section has an output coupled to an intake manifold of the engine. The exhaust gas aftertreatment system is coupled to an output of the turbine section. The exhaust gas aftertreatment system includes a particulate filter having: a housing of an outer wall and an inner wall; a particulate filtering section disposed within the inner wall of the housing; and a channel formed between the inner wall and the outer wall. The channel created by the outer wall includes: an inlet disposed downstream of the filtering section for receiving a portion of exhaust gasses exiting the filtering section, and an outlet coupled to the input of the compressor section of the turbine for transporting the exhaust gasses received by the inlet of the channel to an input of the compressor section.

3 Claims, 4 Drawing Sheets

DUAL WALLED PARTICULAR FILTER FOR TRANSPORTING FILTERED EXHAUST TO A COMPRESSOR OF A DIESEL ENGINE TURBOCHARGER

TECHNICAL FIELD

This invention relates generally to internal combustion engine exhaust gas recirculation (EGR) systems and more particularly to EGR systems for internal combustion diesel engines having turbochargers and particulate filters.

BACKGROUND

As is known in the art, future diesel engines will be required to run a lower feedgas NOx level in order to meet emission requirements. One way in aiding this process would be to introduce Low Pressure Exhaust Gas Recirculation (LPEGR). In order to properly use this LPEGR, a portion of exhaust from downstream of the Diesel Particulate Filter (DPF) is fed back to the compressor of a turbocharger used with the engine. One way to provide such feedback is to use additional exhaust tubing in order to transport the LPEGR from the tailpipe (after the DPF) to the intake (before the turbo charger).

As is also known in the art, many diesel engine vehicles are fitted with a DPF with dual-walled exhaust pipes for maintaining the exhaust temperatures in the exhaust pipes during critical temperature control fluctuations (regenerations of the DPF in cold weather or in rain conditions).

SUMMARY

In accordance with the present invention, an internal combustion engine exhaust gas recirculation system is provided for an internal combustion engine. The engine is coupled to a turbocharger. A turbine section of the turbocharger is coupled to an exhaust manifold of the engine. A compressor section has an output coupled to an intake manifold of the engine. The exhaust gas aftertreatment system is coupled to an output of the turbine section. The exhaust gas aftertreatment system includes a particulate filter. The particulate filter includes: a housing having an outer wall and an inner wall; a particulate filtering section disposed within the inner wall of the housing; and a channel formed between the inner wall and the outer wall. The channel includes: an inlet disposed downstream of the filtering section for receiving a portion of exhaust gasses exiting the filtering section, and an outlet coupled to an input of the compressor section of the turbine for feeding the portion of exhaust gasses received by the inlet of the channel to an input of the compressor section.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
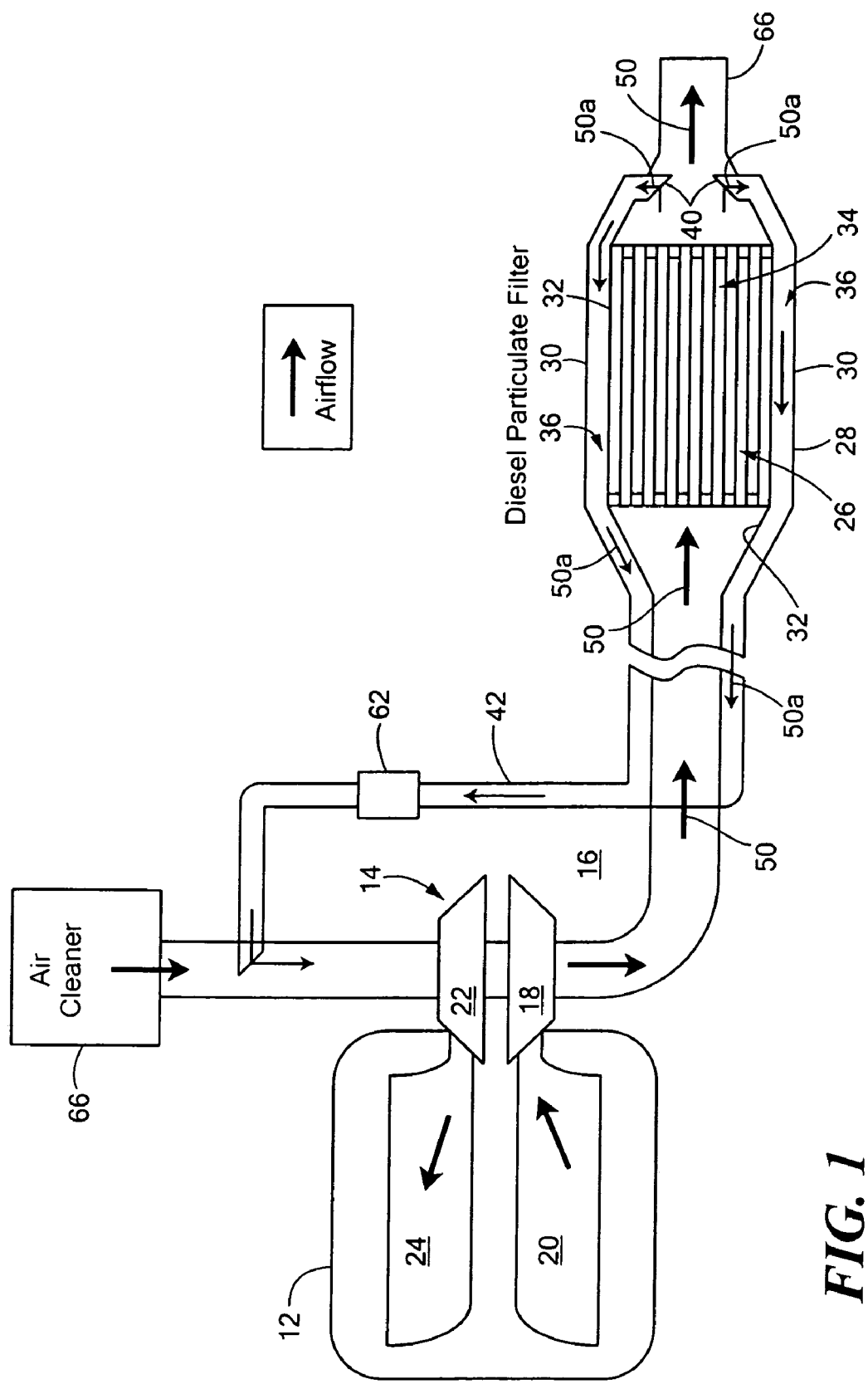
FIG. 1 is a diagrammatical sketch of an internal combustion engine having an exhaust gas aftertreatment system according to the invention.

Referring now to FIG. 1, an internal combustion engine 12, here a diesel engine, is shown. The engine 12 is coupled to a turbocharger 14. A low-pressure exhaust gas recirculation (LPEGR) system 16 is provided for recycling aftertreated exhaust gases back to the turbocharger. 14

Figure 2:
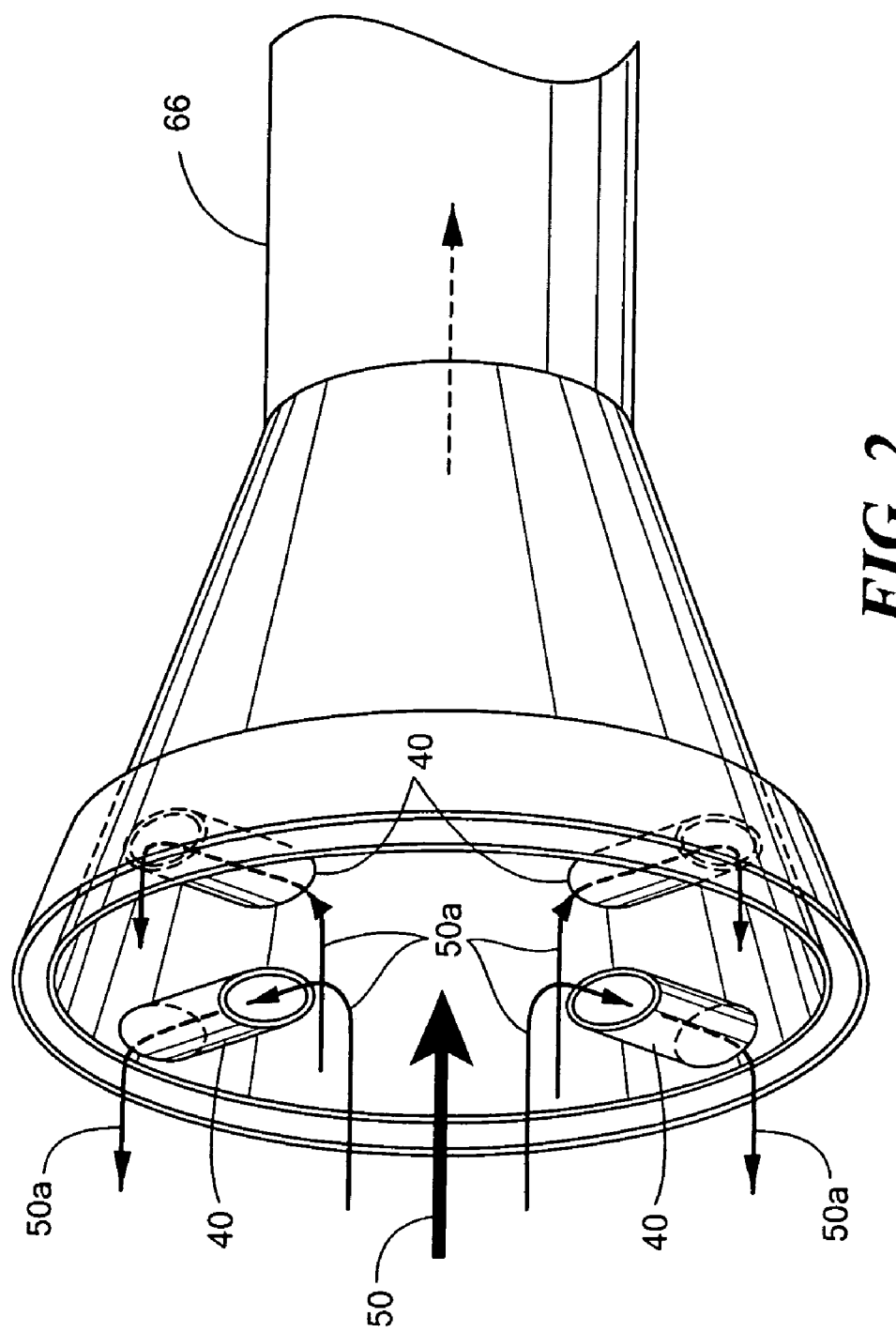
FIG. 2 is an isometric sketch of a rear portion of a diesel particulate filter housing for the exhaust gas aftertreatment system of FIG. 1 according to the invention.

More particularly, a turbine section 18 of the turbocharger 14 is coupled to an exhaust manifold 20 of the engine 12. A compressor section 22 has an output coupled to an intake manifold 24 of the engine 12. The exhaust gas aftertreatment system 16 is coupled to an output of the turbine section 18. The exhaust gas aftertreatment system 16 includes a diesel particulate filter (DPF) 26. The particulate filter 26 includes: a housing 28 having an outer wall 30 and an inner wall 32; a particulate filtering section 34 disposed within the inner wall 32 of the housing 28; and a channel 36 formed between the inner wall 32 and the outer wall 30. The channel 36 includes: an inlet 40 disposed downstream of the filtering section 34 for receiving a portion of exhaust gasses 50a exiting the filtering section 34 (FIGS. 2 and 3); and, an outlet 42 coupled to an input of the compressor section 22 of the turbine 14, as shown, for feeding the portion of exhaust gasses 50a received by the inlet 40 of the channel 36 to an input of the compressor section 22.

Figure 4:
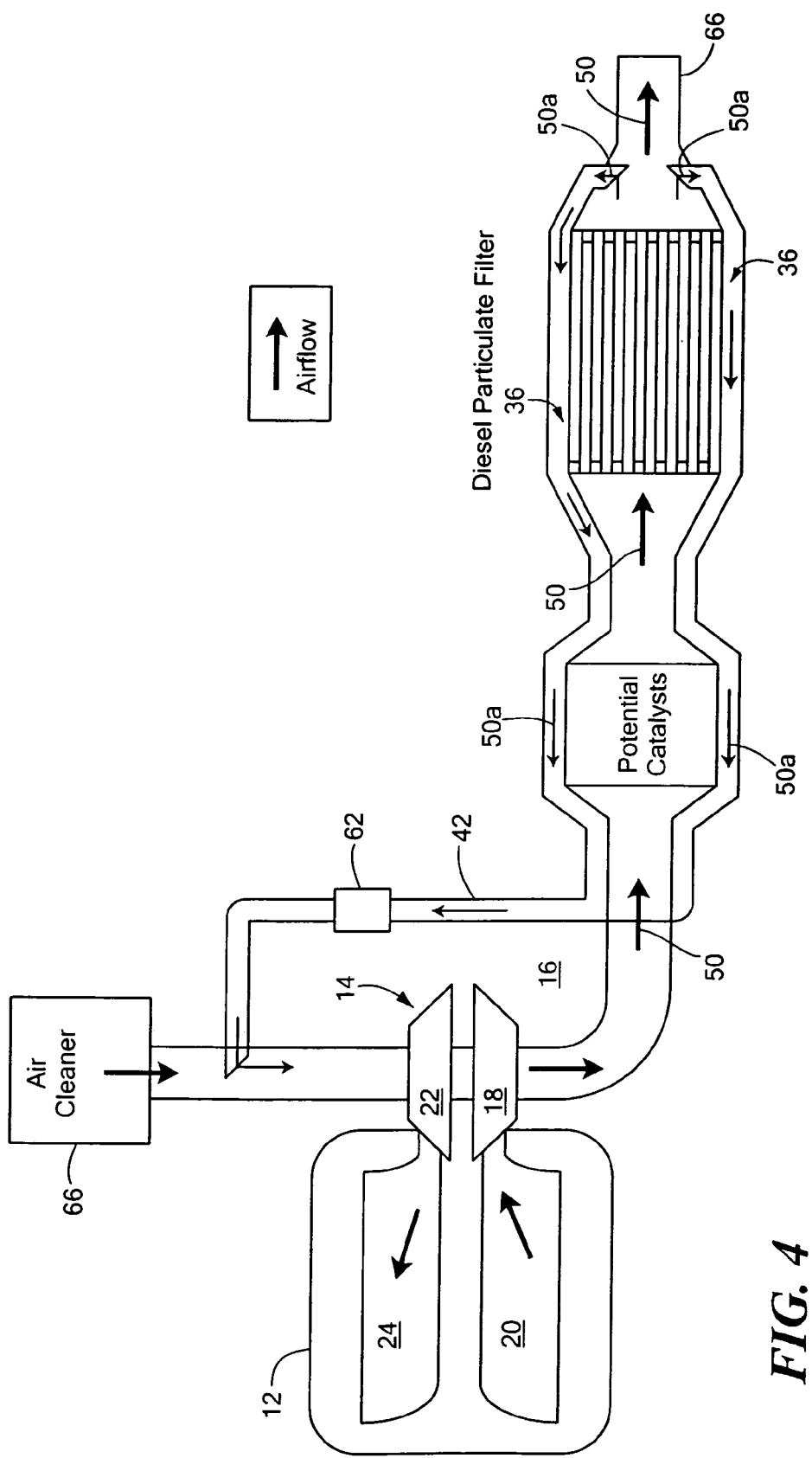
FIG. 4 is a diagrammatical sketch of an internal combustion engine having an exhaust gas aftertreatment system according to another embodiment of the invention ac Like reference symbols in the various drawings indicate like elements.

More particularly, the exhaust gasses from the engine 12 flow from the exhaust manifold 20, through the turbine portion 18 of the turbocharger 14, down exhaust pipes, passing through any configuration of catalyst required, such as for example the arrangement shown in FIG. 4, and then through the DPF 28 towards the tailpipe, not shown. In the exit cone of the DPF 28 are several small inlets where exhaust gasses can enter back into the channel 36, here for example, a ⅛-¼" gap in the dual walled housing of in the entire catalyst-DPF canning or housing. From here the vacuum pressure from the turbocharger compressor 16, or an auxiliary air pump 62 may be used to flow the exhaust from the post DPF region (i.e., the region downstream of the particulate filtering section 34, through the double walled pipe, i.e., channel 36). It is noted that, if necessary, an EGR cooler, not shown, may to be located prior to the re-introduction of EGR into the intake of fresh air located after the air cleaner 66. Thus, the after-treated portion of the exhaust gases at the output of the channel 36 mixes with fresh air from air cleaner 66 and such mixture is fed to the compressor section of the turbocharger 22, as shown.

Figure 3:
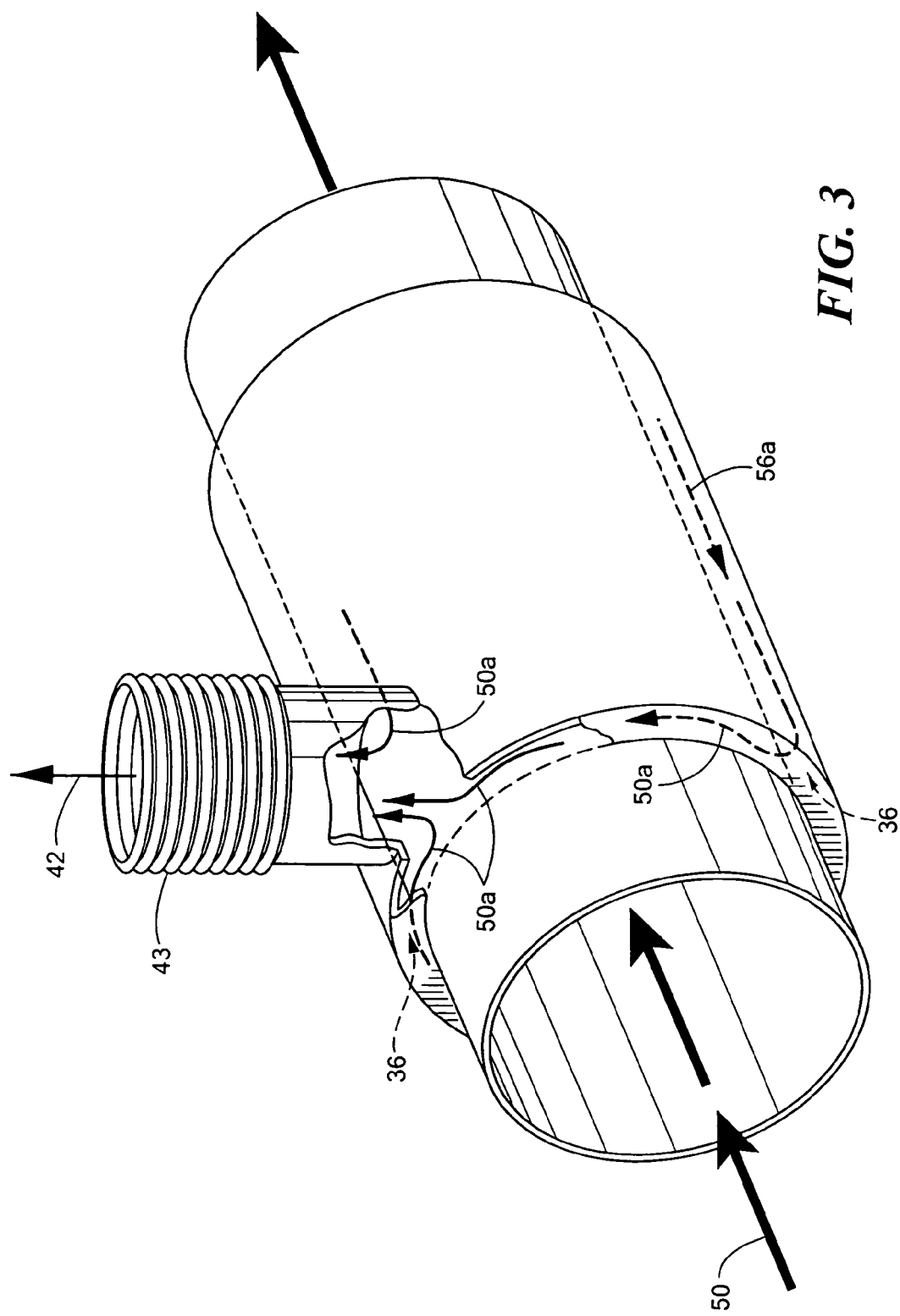
FIG. 3 is a sketch a forward portion of the diesel particulate filter housing for the exhaust gas aftertreatment system of FIG. 1.

At a point where it is convenient to move the gases closer to the intake and away from the exhaust flow, potentially at the turbo charger flange, a tube is formed at the start of the dual-walled portion as shown in FIG. 3 and allows the LPEGR to flow (in a flexible fitting 43 if required) up to the intake (pre-Turbo compressor). Here, the clean LPEGR can be introduced before the turbo (compressor side) with a regulating valve if required. This LPEGR can then displace even more air in the intake manifold [2], but with a reduced turbo lag and particulate count due to its clean and compressed nature.

A number of embodiments of the invention have been described. Nevertheless, it will be understood that various modifications may be made without departing from the spirit and scope of the invention. For example, by changing the location of the DPF to be upstream of any catalytic converters. Accordingly, other embodiments are within the scope of the following claims.

What is claimed is:

1. An internal combustion engine system, comprising:
   an internal combustion engine;
   a turbocharger having:
      a turbine section coupled to an exhaust manifold of the internal combustion engine; and,
      a compressor section having an output coupled to an intake manifold of the engine;
   an exhaust treatment system coupled to an output of the turbine section, such exhaust gas aftertreatment system including a particulate filter, such particulate filter comprising:
      a housing having an outer wall and an inner wall;
      a particulate filtering section disposed within the inner wall of the housing;
      a channel formed between the inner wall and the outer wall, such channel having:
         an inlet disposed downstream of the filtering section for receiving a portion of exhaust gasses exiting the filtering section, and
         an outlet coupled to an input of the compressor section of the turbine for feeding the portion of exhaust gasses received by the inlet of the channel to an input of the compressor section.

2. The internal combustion engine system recited in claim 1 wherein the engine is a diesel engine.

3. The internal combustion engine recited in claim 2 including an air pump disposed between the outlet and the compressor section.

* * * * *